United States Patent [19]
Hollingsworth

[11] 4,059,318
[45] Nov. 22, 1977

[54] HYDROSTATICALLY SUPPORTED TILTING PAD JOURNAL BEARING IMPROVEMENTS

[75] Inventor: Leon W. Hollingsworth, La Habra, Calif.

[73] Assignee: Pioneer Motor Bearing Co., South San Francisco, Calif.

[21] Appl. No.: 719,755

[22] Filed: Sept. 2, 1976

[51] Int. Cl.² .................................... F16C 17/06
[52] U.S. Cl. ................................................ 308/73
[58] Field of Search ........................... 308/73, 160, 72

[56] References Cited

U.S. PATENT DOCUMENTS

| 3,339,990 | 9/1967 | Wendt | 308/73 |
| 3,370,334 | 2/1968 | Pilarczyk et al. | 308/73 X |
| 3,823,991 | 7/1974 | Lamperski | 308/73 |

*Primary Examiner*—Joseph F. Peters, Jr.
*Assistant Examiner*—Gene A. Church
*Attorney, Agent, or Firm*—Townsend and Townsend

[57] ABSTRACT

An improved tilting pad journal bearing for supporting a rotatable shaft and having a plurality of pads hydrostatically supported within a carrier ring by an oil film that is hydrodynamically generated. The improvement includes a bearing pad having a hydrostatic cavity in the outer face of the pad and positioned so that the radial center line of the cavity is in the range of 0° to 12° downstream of the pad radial center line, with reference to the direction of the rotation of the shaft. An improved pad cam for each adjacent bearing pad is also shown. The pad cam is mounted to the carrier ring and has a pair of inclined faces which converge towards each other as the radially innermost portion of the pad cam is approached. Correspondingly, the opposed ends of each pad are generally arcuate to provide pad end surfaces that confront the inclined pad cam surfaces. The pads are thereby better able to pivot about their centers to, in turn, allow the rotating shaft to achieve a near vertical locus under varying load conditions.

9 Claims, 5 Drawing Figures

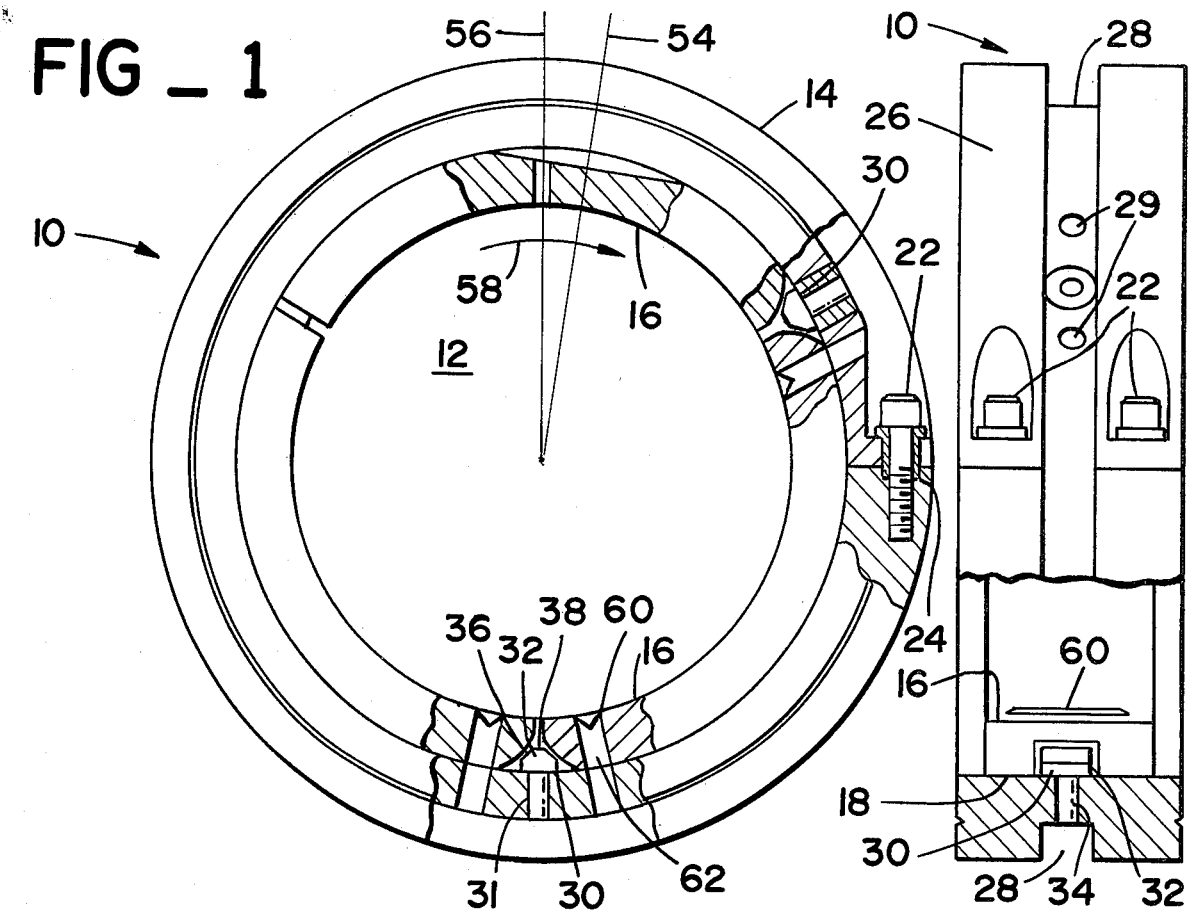
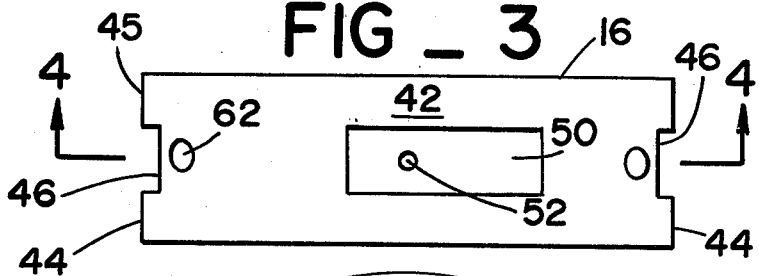
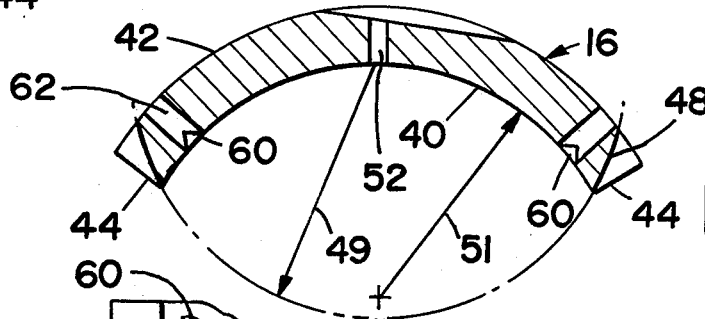
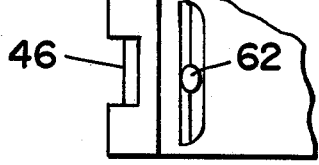

HYDROSTATICALLY SUPPORTED TILTING PAD JOURNAL BEARING IMPROVEMENTS

This invention relates to tilting pad journal bearings and particularly to tilting pad journal bearings that generate a hydrodynamic oil film for hydrostatic support of the pads.

DESCRIPTION OF THE PRIOR ART

Rotating shafts used today in advanced machinery such as modern high-speed compressors, gas turbines, steam turbines, and the like, have made the design of bearings for supporting such shafts an extremely complex problem. Increasing speeds, the use of more flexible shafts, overhung and aerodynamic loads, to name a few factors, have complicated this problem. A variety of bearing designs, including the elliptical, lobed, and tilting pad, have been developed to help minimize rotating shaft bearing instabilities. Of these, the tilting pad has been the most generally successful. But conventional, flood-lubricated, tilting pad journal bearings have several disadvantages, including relatively high power loss, high oil requirements, mechanical complexity, and the costs accompanying these disadvantages. Pivot fretting and limited damping capacity are also among the disadvantages experienced.

Recently, tilting pad journal bearings have been developed which utilize the rotating journal to cause a wedge-shaped hydrodynamic oil film to be formed between the surface of the journal and the bearing. Such tilting pad journal bearings take advantage of the hydrodynamic pressure built up in the wedge-shaped oil film during rotation of the journal to provide a hydrostatic support for the tilting pads of the bearing. Such tilting pad journal bearings consist of a number of pads positioned in surrounding relation to the rotating shaft which are restrained only by pad stops to prevent their rotation with the shaft. Each pad is supported on a self-generated hydrostatic oil film, created by tapping off a small portion of the pad hydrodynamic oil film. This hydrostatic support for the pad provides a cushionable movement to permit the pad to be disposed for accommodation of flexure or misalignment of the journal. Such hydrostatically supported tilting pad journal bearings are described in U.S. Pat. No. 3,549,215, assigned to the assignee of the present invention.

However, such bearings as described above are not without certain problems. For example, it was found that the pads do not properly track the rotating shaft under various eccentricities and load conditions. That is, the pad segments, which are separated and restrained by a number of pad stops located circumferentially about the retaining ring, are restricted by the stops in their tendency to pitch and lift. The pad stops, which are inclined radially to the shaft, provide a restraining surface to the radial ends of the pads to follow a path dictated by the stop. This configuration tends to constrain movement of the pads.

This restriction in pad movement results, in turn, in a reduced capability to track the shaft at all eccentricities and produces a non-vertical shaft locus and unfavorable attitude angles under varying load conditions. That is, as a load is produced upon the rotating shaft, which ideally would tend to move the shaft vertically downward, present bearings inhibit this downward movement and introduce a horizontal component to the shaft locus. Thus, a non-vertical shaft locus and an unfavorable attitude angle is produced with substantial cross-coupling in stiffness and damping effect resulting therefrom. The overall effectiveness of the damping capability of the bearing is materially reduced together with a lowering of its instability threshold.

SUMMARY OF THE INVENTION

The present invention is a culmination of a substantial effort to study the problems, described above, inherent in present hydrostatic tilting pad journal bearings. The objective of a near vertical shaft locus under varying loads of the shaft has been achieved.

Thus, according to the present invention, there is provided an improved tilting pad journal bearing for supporting a rotatable shaft and having a plurality of pads hydrostatically supported within a carrier ring by an oil film that is hydrodynamically generated. The pads are arcuate pad segments held in surrounding relation to the shaft by the carrier ring. Each pad is provided opposing ends, and inner and outer faces. A hydrostatic cavity is provided the outer face of the pad and positioned so that the radial center line of the cavity is within a range of 0° to 12° downstream of the pad radial center line with reference to the direction of the rotation of the shaft. A conduit, extending from the inner face to the cavity of the pad, utilizes the hydrodynamic oil film generated by shaft rotation to provide a support upon which the pad may lift and pitch and tilt axially in response to misalignment, until force and momentum equilibrium is attained for any particular operating condition.

Circumferentially located about the retaining ring, and separating adjacent pads, are a number of pad cams. Their function is to restrain the pads to prevent their rotation with the shaft. Each pad cam is provided a pair of inclined faces which converge towards each other as the radially innermost portion of the pad cam is approached. Each of the opposed pad ends is correspondingly provided with an arcuate surface in confronting relation to the respective face of the cam.

In the preferred embodiment three pad segments are provided in surrounding relation to the rotating shaft. The pad segments are able to float more freely and track the shaft at all eccentricities and load conditions than with previous hydrostatic tilting pad journal bearings. The inclined faces of the pad cams and the correspondingly arcuate confronting end portions of the pads provide the pad segments with substantially more freedom to raise and pitch in a manner similar to that of pads in mechanically pivoted journal bearings.

Moreover, positioning the cavity approximately 55 to 57 percent of the circumferential distance from the leading edge of each pad (in a 3-pad bearing) takes greater advantage of the hydrodynamic pressure generated. Such positioning of the cavity achieves the most consistent pressurization of all pads over the entire range of load orientations.

These improvements allow the pad to properly track the shaft and thereby achieve a nearly vertical locus of the rotating shaft at practically all eccentricities. The reduction of cross-coupling in stiffness and damping is substantially reduced over that previously obtained by prior art bearings. The bearing of the present invention materially increases, over bearings of the prior art, the effectiveness of the bearing to provide inherent damping and stability.

For a better understanding of the present invention, together with other and further features thereof, reference is had to the following description taken in conjunction with the accompanying drawings, the scope of the invention being pointed out in the claims.

BRIEF DESCRIPTION OF THE DRAWINGS

FIG. 1 is an end view of a hydrostatically supported tilting pad journal bearing of the present invention, partly in section, showing in detail the improvements provided by the present invention;

FIG. 2 is a side view, partly in section, of the bearing of FIG. 1;

FIG. 3 is a plan view of one of the tilting pads;

FIG. 4 is a cross-sectional view of the pad taken along line 4—4 in FIG. 3; and

FIG. 5 is a fragmentary view in partial section of one of the ends of the tilting pads showing in detail a spreader groove.

DETAILED DESCRIPTION OF THE PREFERRED EMBODIMENT

Turning now to the drawings, which illustrate the preferred embodiment of the present invention, there is seen a hydrostatic tilting pad journal bearing, generally designated by reference numeral 10, supporting a rotating shaft 12. The bearing 10 includes a carrier ring 14, usually contained within a machine housing (not shown). Held within and supported by the carrier ring 14 are tilting pads 16.

Carrier ring 14 is a split ring held together with bolts 22 inserted through alignment dowels 24. However, the carrier ring may also be one piece. The outer surface 26 of the ring 14 is provided an oil channel 28 which supplies oil to the pads via drilled passages 29.

Located between each adjacent tilting pad 16 are pad cams 30. The pad cams 30 are mounted in the carrier ring 14 by friction fit in apertures 31 provided therefor, although any other method of mounting, such as threads or the like, may be used. Pad cams 30 are defined by a head member 32 supported by a neck element 34. The head 32 of the pad cam 30 is cam-shaped and includes inclined faces 36 which converge as the top portion 38 of the pad cam is approached.

Tilting pads 16 are defined by inner and outer faces 40 and 42, respectively, and opposing ends 44. The inner face 40 has substantially the same diameter as shaft 12. Similarly, the outer face 42 of each tilting pad 16 is provided a diameter sufficient to allow it to conform to the arcuate surface 18 of the carrier ring 14. It should be noted at this point that some operating clearance is provided between the inner face 42 of the tilting pad 16 and shaft 12. Similarly, an operating clearance is also provided between the outer face 42 of the pad 16 and the carrier ring 14. These clearances permit the tilting pads 16 to pitch and tilt in response to dynamic operating conditions and the action of the oil films acting on them, as will be more fully explained below.

A centrally located notch 46 is machined in each end 44 of the pad and in the edge 45 which separate end surfaces 44 and outer surface 42 of each pad. Notch 46 is provided an arcuate surface 48 which is adapted to be in generally opposing and confronting relation with inclined face 36 of the adjacent pad cam. The notch surface 48 is generally circular in nature with a radius of curvature 49 (measured from the pad center) that is presently defined as 1.0104 times the tilting pad radius 51, although other radii may be used.

The outer face 42 of each pad is provided a shallow recess or cavity 50 which is in fluid communication with the inner face 40 by oil passage 52. As FIG. 1 indicates, cavity 50 is machined into the surface 42 of the tilting pads so that the center line 54 of the cavity is positioned downstream of the center line 56 of the path with reference to the shaft rotation indicated by arrow 58.

Adjacent each end 44 of each tilting pad 16 and on the inner face 40 thereof, is an elongate axial-aligned spreader groove 60. Fluid communication between each spreader groove 60 and the outer face 42 of each pad 16 is established by conduits 62. The spreader grooves aid in lubricating the shaft and facilitate generation of the well-known wedge-shaped oil film as will be more specifically discussed below.

In operation, the oil channel 28, enclosed within a machine housing, is filled with oil under pressure. The oil is communicated to the pad 16 via passages 29, appropriately placed in the channel at spaced locations, and to the inner surface 40 of the pad via spreader groove passages 62. During shaft 12 rotation, the shaft picks up oil from the spreader grooves 50 to form the wedge-shaped oil film between the inner surfaces of the pad and the outer surface of the shaft.

Formation of the wedge-shaped oil film pressurizes the lubricant, forcing it from the inner face 40 of each pad, through the passage 52 to the recess 50 to create a hydrostatic film on the back of each pad. This hydrostatic film allows the pad to lift and pitch within the clearances provided between the ring and the shaft, in response to shaft misalignment until force and momentum equilibrium is obtained for any operating condition.

At this point, it is advantageous to note that such lifting and pitching of the pad is freer with the pad cams of the present invention than was previously possible in the prior art. As mentioned above, prior art pad stops, which the pad cams of the present invention replace, provided a radially oriented contact surface to the pad end that constrained the pad, as it lifted and pitched, to follow a path dictated by the stop. The pad was thereby prevented from rotating about its center and tended to rotate about its ends.

In the present invention, the inclined faces 36 of the pad cams and the correspondingly arcuate surface 48 placed in confronting relation with the pad cams allow the pads to pivot about their centers rather than their leading edges. The pads of the present invention are guided in their action by contact with a properly shaped pad ramp, so that they pitch or rotate in a manner similar to that of the pads in mechanically pivoted journal bearings, leading to the desired vertical locus.

Efficiency of operation is also improved by positioning the cavity, as explained above, within a range of 0° to 12° of the center of the pad. It is presently contemplated that a seven-degree positioning downstream of the center of the pad is optimum. The use of downstream cavities within the 0°–12° range apparently allows the pads to float, rotate, and tilt more freely and provides consistent pressurization of all pads over the entire range of load orientations.

A number of bearings have been constructed in accordance with the teachings of the present invention for experimental uses. Tests have indicated that the improvements described herein allow such hydrostatic tilting pad journal bearings to achieve a nearly vertical locus to thereby improve its overall performance. The tilting pads are better able to float freely and better track the shaft allowing the pads to pivot about their centers. The pads are no longer constrained to a radial path, dictated by the radially inclined pad stops of the prior art, which led to cross-coupling in prior art tilting pad bearings.

I claim:

1. An improved tilting pad journal bearing for supporting a rotatable shaft and having a plurality of bearing pad segments that are hydrostatically supported by a hydrodynamically generated oil film and carrier means for supporting the bearing pad segments in surrounding relation to the shaft, the improvement comprising:

a bearing pad having a pair of opposed ends, an inner face, an outer face, an elongated circumferentially extending cavity in the outer face, the radial center line of the cavity being located in the range of 0°-12° of the radial center line of the bearing pad in a direction downstream of the latter with reference to the direction of rotation of the shaft, and a conduit that communicates the hydrodynamically generated oil film to the cavity to provide hydrostatic, pivotal support of the bearing pad when the shaft is rotating, thereby allowing the bearing pad to raise and rock about its center.

2. The improved tilting pad journal bearing in claim 1, wherein the radial center line of the cavity is approximately seven degrees downstream of the radial center line of the bearing pad.

3. The improved tilting pad journal bearing of claim 1, wherein the carrier means supports three bearing pad segments.

4. An improved tilting pad journal bearing for supporting a rotatable shaft and having a plurality of arcuate bearing pad segments that are hydrostatically supported by a hydrodynamically generated oil film and carrier means for supporting the bearing pad segments in engaging relation with the shaft, the improvement comprising:

a pad cam for each respective adjacent bearing pad, the pad cam having means thereon for mounting the same to the carrier means at a location between a pair of the bearing pads and including at least one inclined face disposed in confronting relation to an adjacent, upstream bearing pad relative to the direction of shaft rotation and lying in a plane that intersects a radius of the bearing at a point between the center of the bearing and the radial innermost extremity of the pad cam.

5. The improved tilting pad journal bearing of claim 4, wherein each of the bearing pad segments includes a pair of opposed ends and the downstream end of each of the bearing pad segments includes an arcuate face that is generally in confronting relation to the inclined face of the pad cam.

6. The improved tilting pad journal bearing of claim 4 including a bearing pad having a pair of opposed ends, an inner face, an outer face, and an elongated circumferentially extending cavity in the outer face of the pad, the radial center line of the cavity being in the range of 0°-12° of the radial center line of the bearing pad in the direction downstream of the latter with reference to the direction of rotation of the shaft.

7. A tilting pad journal bearing for supporting a rotatable shaft comprising, in combination:

a plurality of bearing pad segments disposed in surrounding relation to the shaft, each of the bearing pad segments including opposed ends, an inner face, an outer face, a recess in the outer face, and a conduit to establish fluid communication between the inner face and the recess;

a carrier ring for supporting the bearing pad journals;

a pad cam for placement between adjacent pad segments, each pad cam having means thereon for mounting the pad cam to the carrier ring at a location between adjacent ends of the pad segments, the pad cam including a pair of inclined faces which are relatively convergent as the radial innermost periphery of the pad cam is approached; and a lubricant contained within the bearing from which is hydrodynamically generated a lubricant film when the shaft is rotating that is communicated via the conduit to and accumulated by the recess of each of the pad segments to provide a hydrostatic support upon which each pad segment may be pivotally supported, the inclined faces of each pad cam being in confronting relation to one of the opposed ends of each of the pad segments to define a clearance that allows each pad segment to pitch and rock about its center on the hydrostatic support as the shaft is rotating.

8. The tilting pad journal bearing of claim 7, including an elongated circumferentially extending cavity in the outer face of each of the bearing pad segments, the radial center line of the cavity being in the range of 0°-12° of the radial center line of the bearing pad segment in a direction downstream of the latter with reference to the direction of rotation of the shaft.

9. The tilting pad journal bearing of claim 8, wherein each of the adjacent ends of each of the pad segments includes a face adapted to be in confronting and generally opposing relation to the inclined face of the pad cam adjacent thereto.

* * * * *